United States Patent [19]

Yamaura et al.

[11] Patent Number: 4,709,295
[45] Date of Patent: Nov. 24, 1987

[54] DIGITAL PROTECTIVE RELAY SYSTEM

[75] Inventors: Mitsuru Yamaura, Hachioji; Junichi Inagaki; Hachidai Ito, both of Fuchu, all of Japan

[73] Assignee: Kabushiki Kaisha Toshiba, Kawasaki, Japan

[21] Appl. No.: 673,419

[22] Filed: Nov. 20, 1984

[30] Foreign Application Priority Data

Nov. 24, 1983 [JP] Japan .................................. 58-219560

[51] Int. Cl.$^4$ .............................................. H02H 3/00
[52] U.S. Cl. ...................................... 361/80; 364/483; 364/492
[58] Field of Search .................................. 361/78–82, 361/88, 93; 364/483, 492, 200

[56] References Cited

U.S. PATENT DOCUMENTS

| | | | |
|---|---|---|---|
| 3,984,737 | 10/1976 | Okamura et al. | 361/80 |
| 4,313,169 | 1/1982 | Takagi et al. | 361/80 X |
| 4,339,802 | 7/1982 | Yamaura et al. | 361/78 X |
| 4,344,143 | 9/1982 | Kurosawa et al. | 361/80 X |
| 4,371,947 | 2/1983 | Fujisawa | 361/78 X |
| 4,435,764 | 3/1984 | El-Gohary | 364/200 |
| 4,455,612 | 6/1984 | Girgis et al. | 361/80 X |
| 4,528,611 | 7/1985 | Udren | 361/81 |
| 4,570,231 | 2/1986 | Bunch | 361/80 X |

Primary Examiner—A. D. Pellinen
Assistant Examiner—A. Jonathan Wysocki
Attorney, Agent, or Firm—Schwartz, Jeffery, Schwaab, Mack, Blumenthal & Evans

[57] ABSTRACT

In a digital protective relay system for protecting an electric power system, a first digital operation device receives digital data on the electrical quantities of the power system and performs an operation on the digital data to produce an intermediate result, which is then stored in a memory unit. A second digital operation device reads the intermediate result from the memory unit and performs an operation on the intermediate result to produce a final result. The memory unit is so connected as to permit writing by the first operation device only, and to permit reading by the second operation device only.

9 Claims, 10 Drawing Figures

DIGITAL PROTECTIVE RELAY SYSTEM

BACKGROUND OF THE INVENTION

This invention relates to digital protective relay systems, and more particularly to digital protective relay systems of the type including a plurality of digital operation units.

Applications of microcomputers to protective relay systems for protecting electic power systems are well known. An example of such prior art digital protective relay systems is shown in FIG. 1. In this example, a plurality of data on the power system such as those of voltages v and currents i derived from the power system are applied to input converters 1-1, 1-2, ..., 1-6 which convert the data into voltage and current values suitable for the subsequent processing. The outputs of the input converters are then applied to sample/hold (S/H) circuits 2-1, 2-2, ..., 2-6, by which simultaneous sampling of all the inputs are made. The outputs of the sample/hold circuits 2-1 through 2-6 are applied to a multiplexer (MPX) 3, whose outputs are serially applied to an analog/digital (A/D) converter 4 and converted into digital values. The thus digitized data or relay inputs are then applied to a digital processing device 8. In the digital processing device 8, the digital values from the A/D converter 4 are supplied through a direct memory access (DMA) controller 5 to a digital operation unit or central processing unit (CPU) 6. The CPU 6 comprises an arithmetic logic unit (ALU) 6-1, a data memory (MEM) 6-2, a program memory (ROM) 6-3, and an output (DO) circuit 6-4. The ALU 6-1 receives the above described voltage data and current data, in digital form, supplied from the DMA controller 5 through the data memory (MEM) 6-2 as well as set values from a setting circuit (SET) 7. The ALU 6-1 carries out discriminating operations of the respective relaying elements on the basis of the data supplied thereto and according to predetermined programs stored in the ROM 6-3. The ALU 6-1 then performs sequential processing, i.e., logical operation to determine the synthetic result by logically combining the results of the discriminating operations and delivers a final output i.e., a relay output RY through the output circuit 6-4 in accordance with predetermined programs stored in the ROM 6-3.

FIG. 2 illustrates well-known operational characteristics of a conventional distance relay, in which three relay elements, i.e., a mho element SU and reactance elements 01 and 03 are combined.

FIG. 3 is a block diagram showing a logic circuit capable of providing the operational characteristics shown in FIG. 2. The logic circuit comprises logical-product circuits (AND gates) AND1 and AND2, a logical-sum circuit (OR gate) OR, and timers TDE1 and TDE2, and delivers the relay output RY.

According to the recent development in semiconductor techniques, it has been made possible to use, as the processing unit 6, a microprocessor which is operable at a high speed. By use of the microprocessor operable at a high speed, a protective relay system capable of performing discriminating operations of a large number of relay elements and capable of performing complicated logical operations can be realized.

Furthermore, the recent increase in the size of the power system has led to expansion of protective relay installations required for protecting the power system, which is problematical. As a solution to such a problem, digital protective relay systems are increasingly employed, which is capable of fault discriminations for a large number of objects to be protected, and of complicated logical operations on the results of the discriminations and which can be made compact.

The prior art digital protective relay system which includes a single digital operation unit (CPU) adapted to perform fault discriminations of a large number of objects to be protected, and a number of logical operations, has the following drawbacks.

For executing the fault discriminations of various objects by use of a single digital protective relay system, not only is it necessary for the microprocessor and the peripheral circuits thereof to be operable at a high speed, but also the circuit elements for detecting voltage data v and current data i need to operate at a high speed. As a result, the cost of the entire protective relay system is increased. Furthermore, the use of such a high-speed relay system would be excessive when the number of objects to be protected is small, and hence a small number of fault discriminations are required. It is thus difficult to provide a protective relay system whose capability matches the particular need.

In addition, the above described relay system exhibits a difficulty in expanding its capability. For instance, when an electric power transmission line is expanded and the number of objects to be protected increases, it is not sufficient to increase the number of the input circuits for inputting the system data such as data on voltages v and currents i, and the number of control circuits for the input circuits, but the programs for executing the protection of the transmission line must be also modified. After the modification of the programs, not only those parts of the programs which have been added, but also the entire programs need to be checked as to their function for assuring the reliability of the programs.

For this reason, the expansion in capability of the protective relay system to cope with an increase in the number of the objects for the protection is not easy. Furthermore the provision of expansibility of the system also encounters a difficulty from the designing and the construction of the system. More specifically, a system so designed as to allow for a large number of input data (voltage data v and current data i) would have an excessive capability when the relay system is applied to a power system where the number of the input data is small. Furthermore, since different programs must be formed for different numbers and combinations of the objects to be protected, standardization of the programs is difficult. Moreover, since the entire operations are executed by a single digital operation unit, a trouble which has occurred in a part of the function of the digital operation unit may cause break-down of the entire operations. The operation of the relay system is therefore not reliable.

Thus, although the conventional circuit arrangement may be applied to form a digital protective relay system for a large number of objects to be protected, such a system has various problems.

SUMMARY OF THE INVENTION

An object of the present invention is to provide a digital protective relay system which can be readily modified to cope with the variation, particularly, increase, in the number of the objects to be protected and complication of the logical operations.

Another object of the invention is to provide a digital protective relay system which is highly reliable and with which standardization is easy, with respect to its hardware and software.

According to the present invention, there is provided a digital protective relay system for protecting an electric power system, the relay system comprising:

at least one first digital operation device receiving digital data on the electrical quantities of the power system and performing an operation on the digital data to produce a result of the operation which constitutes an intermediate result, at least one memory unit for storing the intermediate result, and at least one second digital operation device receiving the intermediate result from the memory unit and performing an operation on the intermediate result to produce a result of the operation which constitutes a final result, wherein the memory unit is so connected as to permit writing by the first operation device only, and to permit reading by the second operation device only.

DESCRIPTION OF THE PREFERRED EMBODIMENTS

Figure 1:
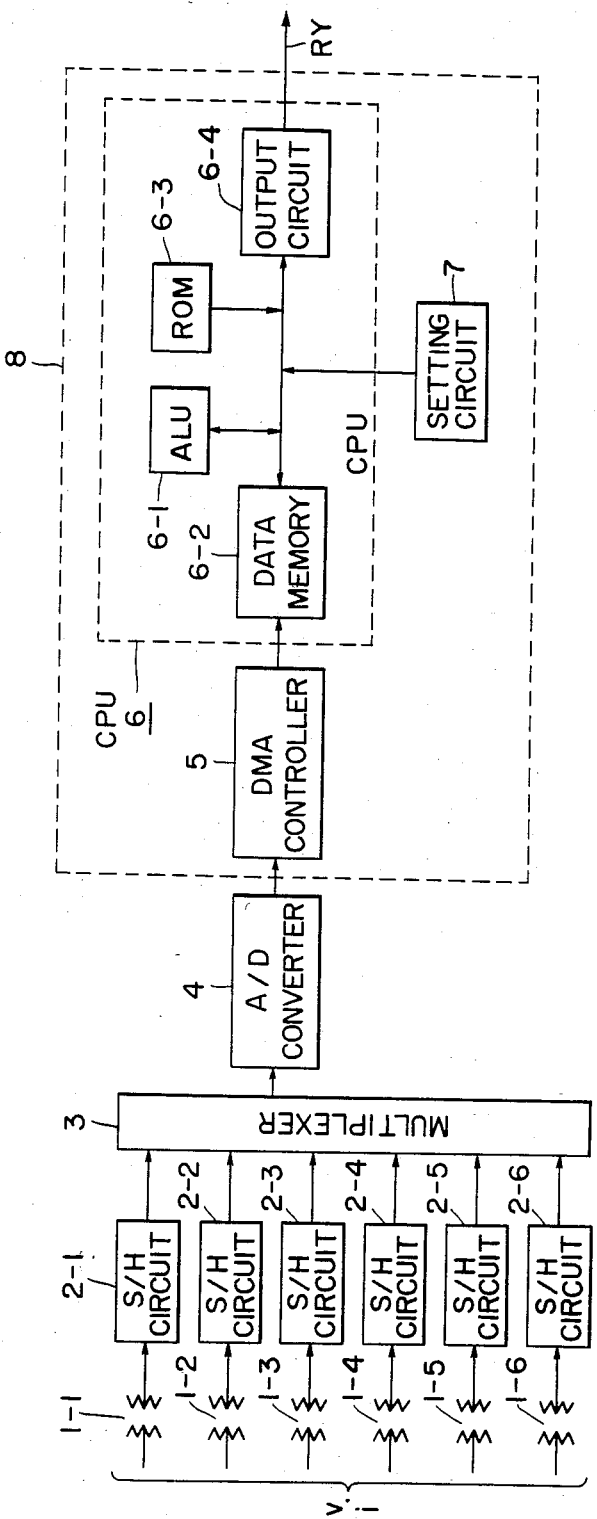
FIG. 1 is a block diagram showing a conventional digital protective relay system.
Figure 2:
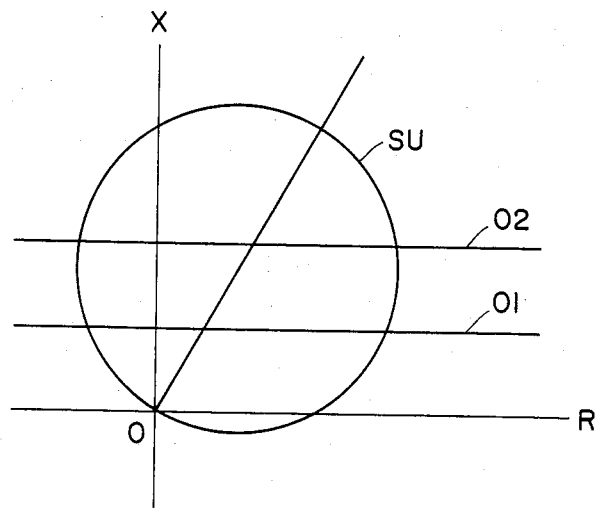
FIG. 2 is a diagram showing operational characteristics of a distance relay system.
Figure 3:
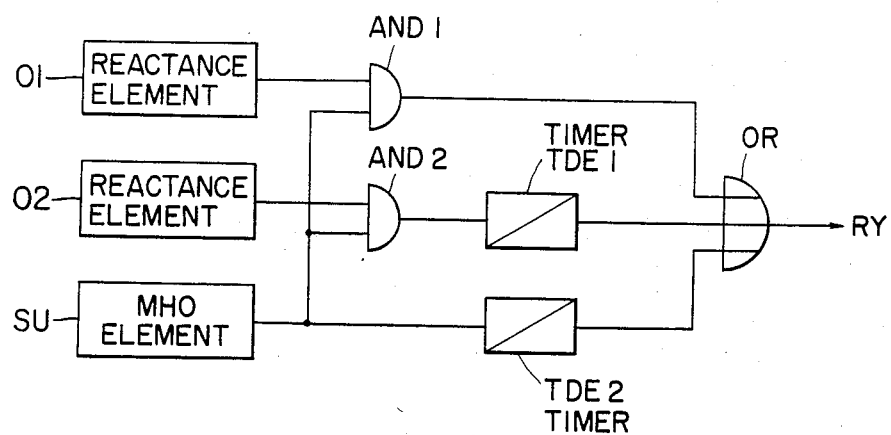
FIG. 3 is a block diagram showing an example of logical operations carried out by the distance relay system.
Figure 4:
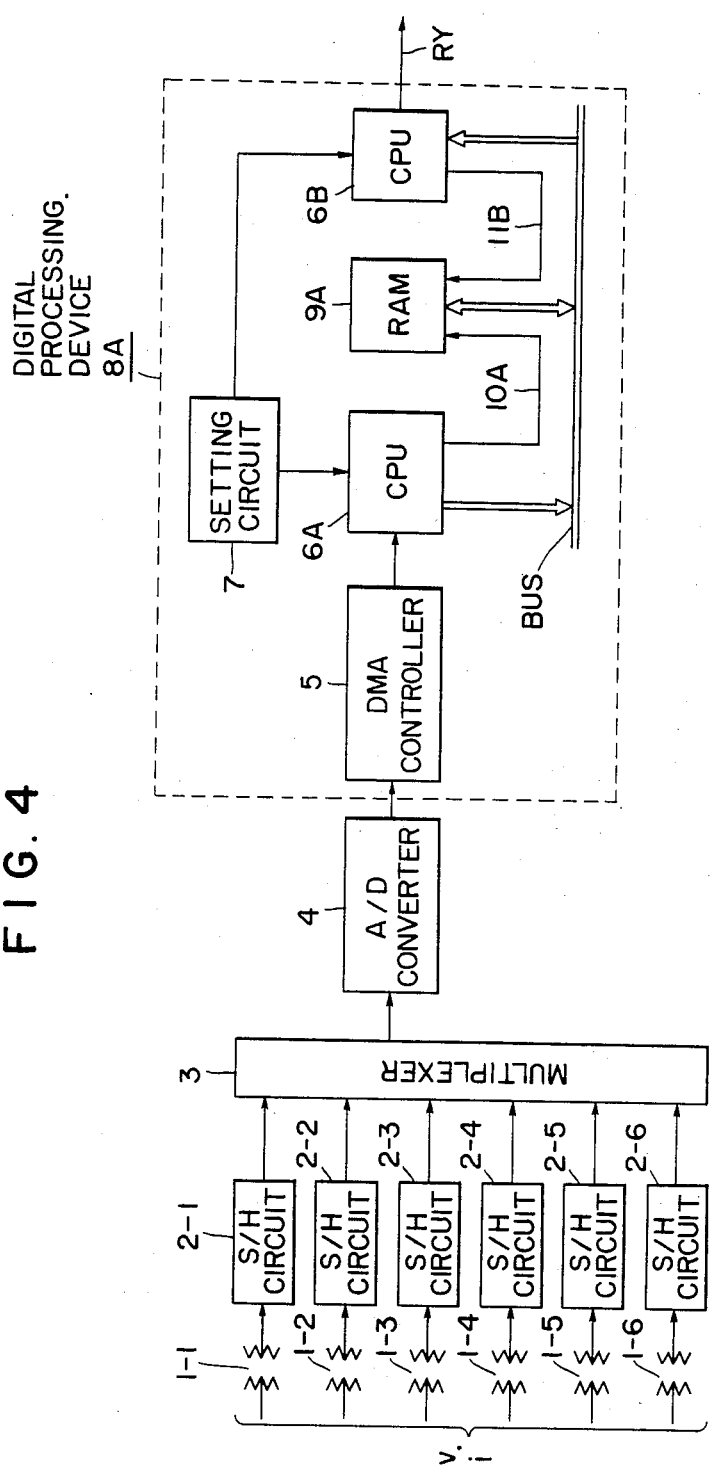
FIG. 4 is a block diagram showing an embodiment of a digital protective relay system according to the present invention.

FIG. 4 illustrates an embodiment of the invention which is applied to a distance relay system. In the drawings, components similar to those illustrated in FIGS. 1 through 3 are designated by the same reference numerals.

In FIG. 4, a plurality of system data v and i are inputted into input converters 1-1, 1-2, ..., 1-6. The outputs of the input converters 11 through 1-6 are applied to sample/hold (S/H) circuits 2-1 through 2-6, by which simultaneous sampling of all the inputs is made. The outputs of the S/H circuits are applied to a multiplexer (MPX) 3, whose outputs are serially applied to an analog/digital (A/D) converter 4 to be converted into digital signals. The digitized data, or relay inputs are then applied to a digital processing device 8A.

In the embodiment shown in FIG. 4, the functions to be performed by a digital operation unit (CPU) are divided and allotted to a first digital operation unit (CPU) 6A and a second digital operation processing unit (CPU) 6B, which execute discriminating operations of the relay elements and logical operations, i.e., sequential processings, respectively. The hardware structure of each of the CPU's 6A and 6B is essentially identical to that of the CPU 6 shown in FIG. 1.

The first CPU 6A receives the voltage data v and the current data i in digital form received from the A/D converter 4 through a direct memory access (DMA) controller 5. The first CPU 6A further receives set values for a mho element SU and reactance elements 01 and 02 obtained from a setting (SET) circuit 7. The first CPU 6A delivers the results of the discriminating operations (which constitute intermediate results of the entire operations) onto a BUS as well as a WRITE signal 10A. The results of the discriminating operations and the WRITE signal are input to a well-known memory circuit (RAM) 9A, which may be in the form of a semiconductor memory, and results of the discriminating operations are stored in the RAM 9A. When the RAM 9A receives a READ signal 11B from the second CPU 6B, it delivers the results of the discriminating operations stored therein onto the BUS. The second CPU 6B delivers the READ signal 11B for receiving the operation results stored in the RAM 9A through the BUS, and also receives set values for the timers TDE1 and TDE2 set by the setting circuit 7. The second CPU 6B delivers a relay output RY which may be a final result of the entire operations and which is used to operate a circuit breaker, not shown, of the power system or to produce an alarm.

The hardware arrangement or the connection of the RAM 9A is such that the RAM 9A receives the WRITE signal 10A from the first CPU 6A but not from the second CPU 6B, so that the writing operation of the RAM 9A is made possible only from the first CPU 6A, and not from the second CPU 6B. Such a hardware arrangement is realized, for example, by not providing connection between the second CPU 6B and that terminal of the RAM 9A which receives a WRITE signal.

The operation of the embodiment of FIG. 4 will now be described with reference to a flow chart of FIG. 5 and a time chart of FIG. 6. It is assumed that the first CPU 6A executes discriminating operations of the relay elements O1, O2 and SU as shown in FIG. 3, while the second CPU 6B carries out the logical operations shown in FIG. 3, that is, the logical operations of the AND gates AND1 and AND2, timers TDE1 and TDE2, and the OR gate OR.

Figure 5:
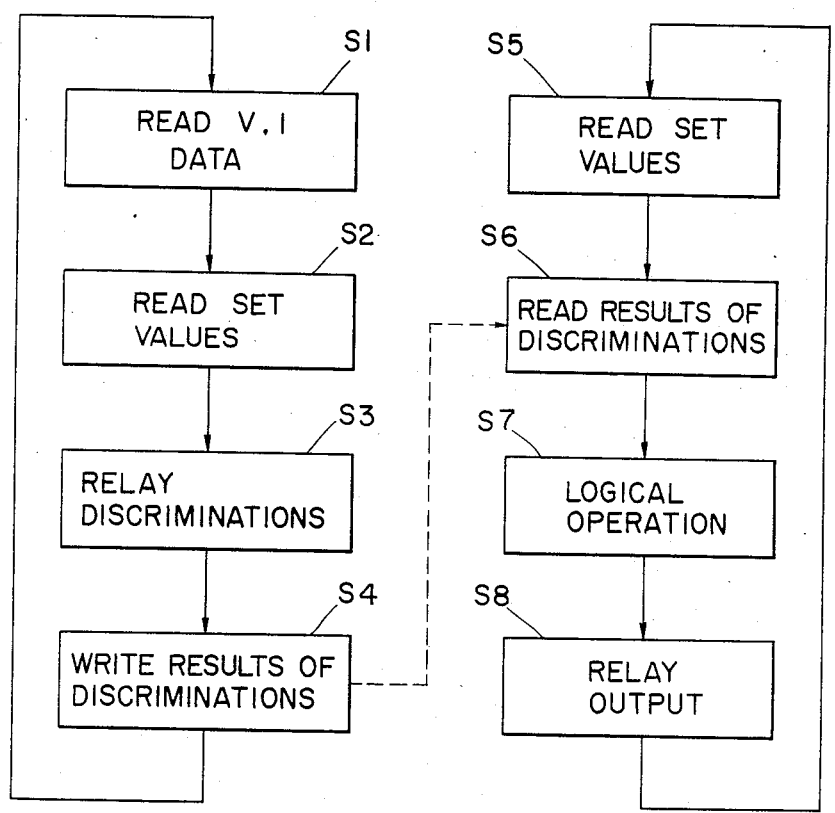
FIG. 5 is a flow chart showing processings executed by first and second CPU's shown in FIG. 4.

In the flow chart of FIG. 5, the steps S1 through S4 are carried out by the first CPU 6A, while the steps S5 through S8 are carried out by the second CPU 6B. In the first step S1, the first CPU 6A reads the voltage data and the current data from the DMA controller 5. In the second step S2, the first CPU 6A reads set values for the relay elements from the setting circuit 7. In the third step S3, the CPU 6A carries out discriminating operations of the mho relay element SU and the reactance relay elements O1 and O2 in accordance with the programs stored in the internal ROM. In the fourth step S4, the CPU 6A delivers the results of the discriminations to the BUS, and it delivers the WRITE signal 10A to the RAM 9A. Upon receipt of the WRITE signal 10A, the RAM 9A takes in the results of the discriminations then appearing on the BUS and stores the same.

In the step S5, the second CPU 6B reads the set values for the timers set by the setting circuit 7, while in the step S6, the CPU 6B delivers the READ signal 11B to the RAM 9A. Upon receipt of the READ signal 11B, the RAM 9A delivers the results of the discriminations stored therein to the BUS. The second CPU 6B reads the results of the discriminations from the BUS. In the step S7, the CPU 6B carries out the logical operations shown in FIG. 3 in accordance with programs stored in the internal ROM. In the eighth step S8, the second CPU 6B delivers a relay output RY.

Figure 6:
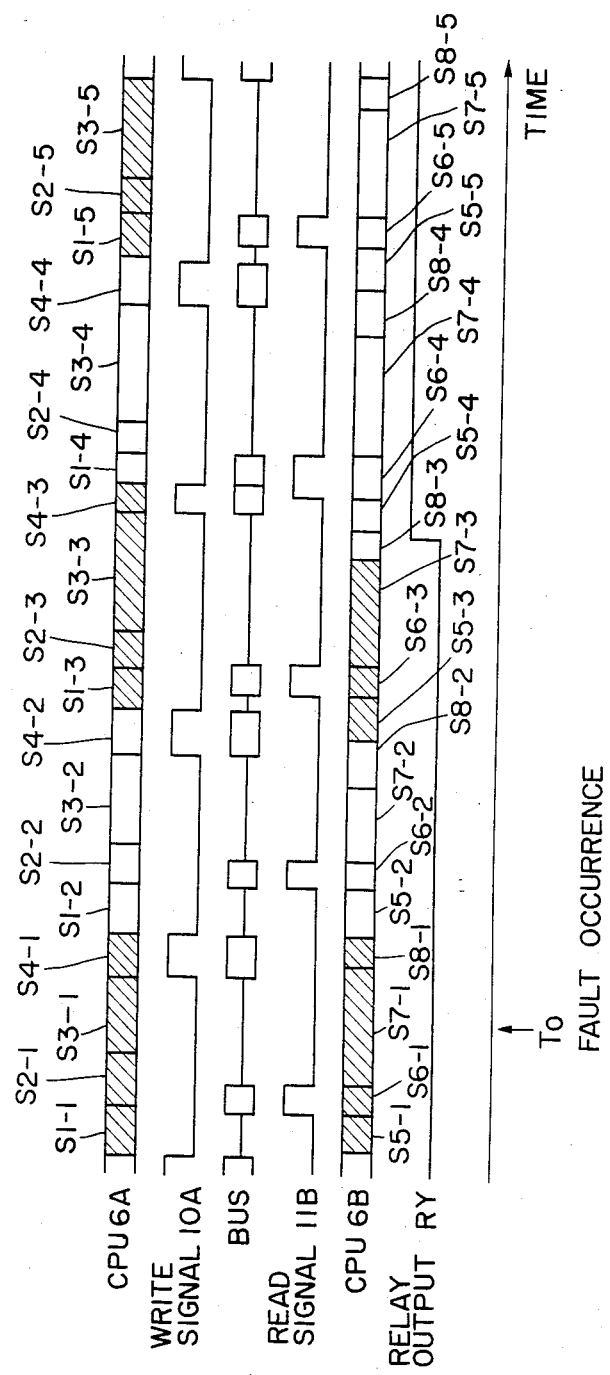
FIG. 6 is a time chart for the operation steps shown in FIG. 5.

FIG. 6 is a time chart for illustrating the above described operations. The steps corresponding to those in FIG. 5 are designated by the same references, with a suffix -1, -2, -3, . . . It is assumed that a fault occurs in a transmission line at an instant To. In a step S1-1, the CPU 6A receives the current and voltage data prior to the occurrence of the fault. In a step S2-1 the CPU 6A reads the set values. In a step S3-1, the CPU 6A carries out the discriminating operations of the relay elements, and delivers in a step S4-1 the WRITE signal 10A, while it delivers the results of the discriminations to the effect of non-operation of the relay elements, onto the BUS.

On the other hand, in the step S1-2 which is carried out after the instant To when the fault occurs, the CPU 6A reads the current and voltage data obtained after the occurrence of the fault. In the step S2-2, CPU 6A reads the set values. In the step S3-2, the CPU 6A carries out the discriminating operations of the relay elements, and in the step 4-2, it delivers the WRITE signal 10A, while simultaneously delivering the results of the discrimination to the effect of "operation" of the relay elements, onto the BUS. The operations carried out in the subsequent steps S1-3 to S4-3 are similar to those carried out in the aforementioned steps S1-2 to S4-2.

The results of the discriminations which are delivered to the BUS simultaneously with the WRITE signal 10A are stored in the RAM 9A. In the step S5-2, CPU 6B reads set values, for instance, for the timers and the like, and in the step S6-2 it delivers the READ signal 11B to the RAM 9A. Upon receipt of the signal 11B, the RAM 9A delivers the results of the discriminations indicative of "non-operation" of the relay elements, which have been stored therein during the step S4-1, to the BUS, and the CPU 6B receives the results appearing on the BUS. In the step S7-2, the CPU 6B executes the logical operations, and in the step S8-2, it delivers a relay output RY which does not command operation of circuit breaker or the like. The steps S5-1 to S8-1 are similar to those described above.

In the step S5-3, the set values are read, and in the step S6-3, the CPU 6B reads the results of the discriminations of the relay elements, which have been stored in the RAM 9A in the step S4-2. The CPU 6B executes the logical operations in the step S7-3, and delivers the relay output RY in the step S8-3 commanding operation of the circuit breaker or the like. The operations executed in the subsequent steps S5-4 to S8-5 are similar to those described with respect to the steps S5-3 to S8-3.

When the WRITE signal 10A from the CPU 6A and the READ signal 11B from the CPU 6B are delivered substantially in the same period as in the case of the steps S4-3 and S6-4 shown in FIG. 6, the operation of one of the CPU's which has delivered the signal later than the other is made to wait until the operation of the other CPU terminates. In the illustrated example, the execution of the step S6-4 by the CPU 6B is suspended until the execution of the step S4-3 by the CPU 6A terminates, so that the period of the step S6-4 is extended.

With the embodiment described above, even when one of the CPU's has a failure in its hardware or software, operation of the other CPU is not prevented, so that the function of the protective relay system as a whole is not interrupted. That is, when, for instance, the first CPU 6A has trouble, abnormal data are written in the RAM 9A, and the second CPU 6B may read the abnormal data. But no abnormal signal is inputted into the internal circuit of the second CPU 6B, and hence normal operation of the second CPU 6B can be continued. On the other hand, when the second CPU 6B has trouble, the operation of the first CPU 6A is executed normally because the second CPU 6B cannot write data in the RAM 9A, and hence no abnormal signal is inputted into the internal circuit of the first CPU. In consequence, correct results of the discriminations are written in the RAM 9A. Thus, a failure in one of the CPU's does not prevent operation of the other CPU, nor does it cause a failure in the other CPU.

Furthermore, when it becomes necessary for a relay system having a short-circuit protecting relay element to be modified so that it also has a grounding fault protecting relay element, or any other relay element, it is sufficient to add another first CPU (not shown) for carrying out the additional discrimination operations and to modify programs of the second CPU 6B for executing the logical operations, and such an addition of the first CPU (not shown) and the modification of the program do not affect the operations of the CPU 6A. Checking of the programs and hardware is required only for those parts thereof which have been added or modified. More specifically, in the example under consideration, the checking needs to be carried out only for the first CPU which has been added and the second CPU 6B whose programs have been modified, while the first CPU 6A which has not been modified need not be checked. In consequence, expansion and modification of the protective functions of the relay system can be readily made without lowering the reliability, while standardization of those portions which are not modified is possible. Furthermore, since the protective functions of the system can be increased or decreased into conformity with the objects to be protected, a digital protective relay system of a high reliability and a low cost can be realized.

Figure 7:
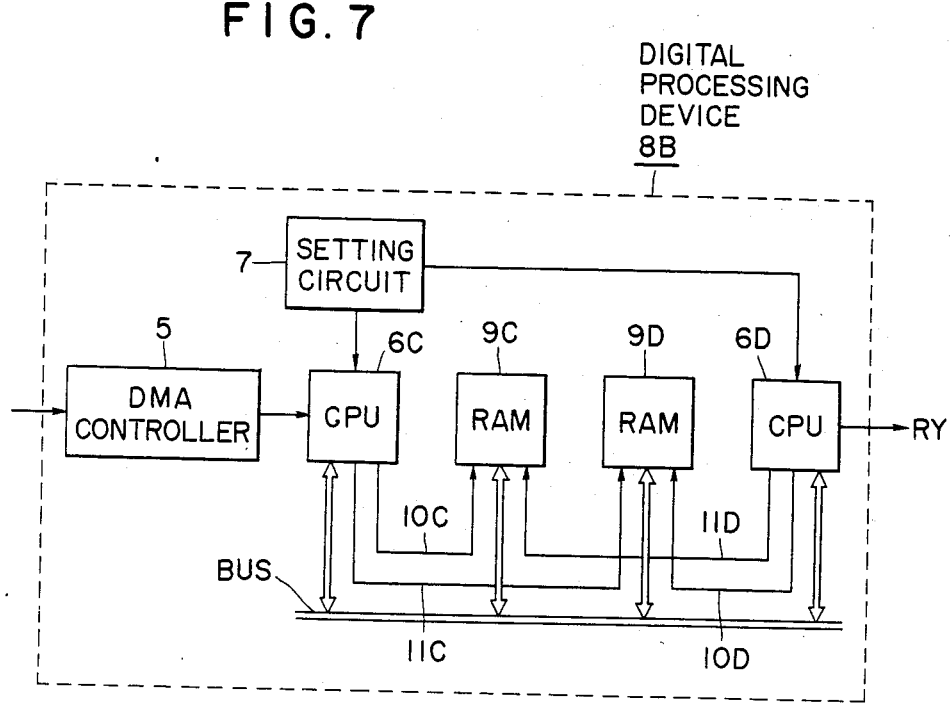
FIGS. 7 through 10 are block diagrams showing other embodiments of the invention.

FIG. 7 shows a second embodiment of the invention. This embodiment differs from the first embodiment shown in FIG. 4 in that the digital processing device now designated by 8B includes a second RAM 9D in which only a second CPU 6D can write, and from which only a first CPU 6C can read, in addition to a first RAM 9C in which only the first CPU 6C can write and from which only the second CPU 6D can read. Components of the digital processing device 8B designated by the same references are similar to those shown in FIG. 4 and the components other than the digital processing device 8B are similar to those shown in FIG. 4.

The embodiment shown in FIG. 7 operates as follows. The first CPU 6C delivers a READ signal 11C to the second RAM 9D thereby to read the results of the logical operations from the second RAM 9D through the BUS. The first CPU 6C also receives the voltage and current data in digital values from the DMA controller 5, and receives set values for the relay elements from the setting circuit 7. The first CPU 6C then carries out the discriminating operations for the relay elements in accordance with stored programs, and delivers the results of the discrimination onto the BUS simultaneously with a WRITE signal 10C to the first RAM 9C. Upon reception of the WRITE signal 10C, the RAM 9C stores the results of the discrimination appearing on the BUS. When a READ signal 11D from the second CPU 6D is applied, the first RAM 9C delivers the results of the discrimination stored therein onto the BUS.

The second CPU 6D takes in the results appearing on the BUS. The second CPU 6D further receives the set values such as time set values of the relays from the setting circuit 7, and carries out logical operations in accordance with the stored programs, and produces a relay output RY. The second CPU 6D also delivers the results of the logical operations to the BUS and a WRITE signal 10D to the second RAM 9D. Upon reception of the WRITE signal 10D, the second RAM 9D stores the results of the logical operations. When the READ signal 11C is supplied from the first CPU 6C, the RAM 9D delivers the results of the logical operations onto the BUS.

As is apparent from the above description, the second embodiment has an additional advantage that the results of the logical operations can be transferred from the second CPU 6D to the first CPU 6C. This feature enhances the flexibility of the system.

Figure 8:
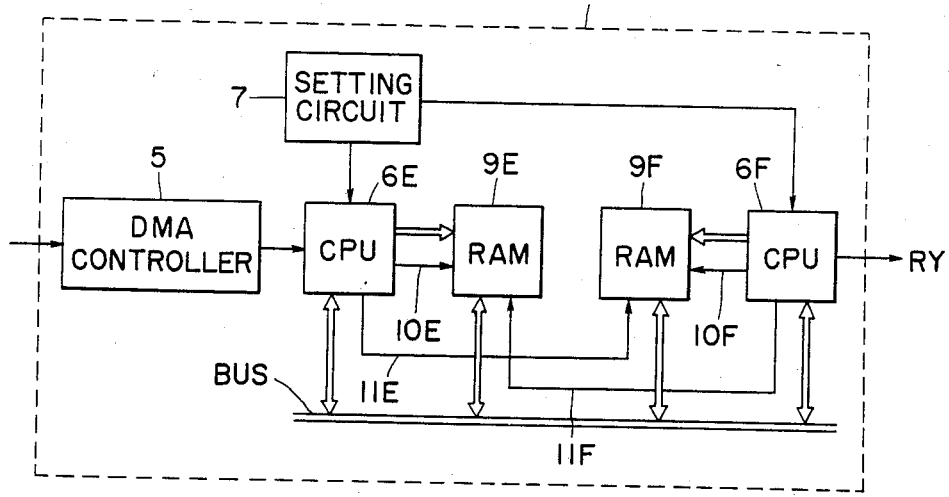

FIG. 8 shows a third embodiment of the present invention. The embodiment differs from the second embodiment shown in FIG. 7 in that the digital processing device designated by 8C comprises a first RAM 9E and a second RAM 9F provided between a first CPU 6E and the BUS and a second CPU 6F and the BUS, respectively, so that the writing operations from the first CPU 6E to the first RAM 9E and from the second CPU 6F to the second RAM 9F are carried out directly, i.e., not via the BUS, and that only the reading operations out of the RAM 9E and RAM 9F made by the CPU's 6F and 6E are carried out through the BUS. Other components similar to those shown in FIG. 7 are designated by the same reference numerals.

The operation of the above described embodiment is similar to that described with respect to the second embodiment except that the writing operations by the first CPU 6E into the first RAM 9E and by the second CPU 6F into the second RAM 9F are carried out directly, by delivering WRITE signals 10E and 10F from the CPU's 6E and 6F to the RAM's 9E and 9F.

In the third embodiment, the writing operations into the first RAM 9E and the second RAM 9F are not affected by any trouble occurring in the BUS. In consequence, the operations of the first CPU 6E and the second CPU 6F can be executed normally. The reliability of the digital protective relay system is thereby improved. Moreover, since the BUS is utilized only for the reading operation of the RAM's, the frequency of utilization of the BUS is reduced. The waiting time, that is the time for which one CPU must interrupt its operation and wait until the utilization of the BUS by the other CPU terminates, can be minimized, and hence the processing speed of the CPU's is improved.

Figure 9:
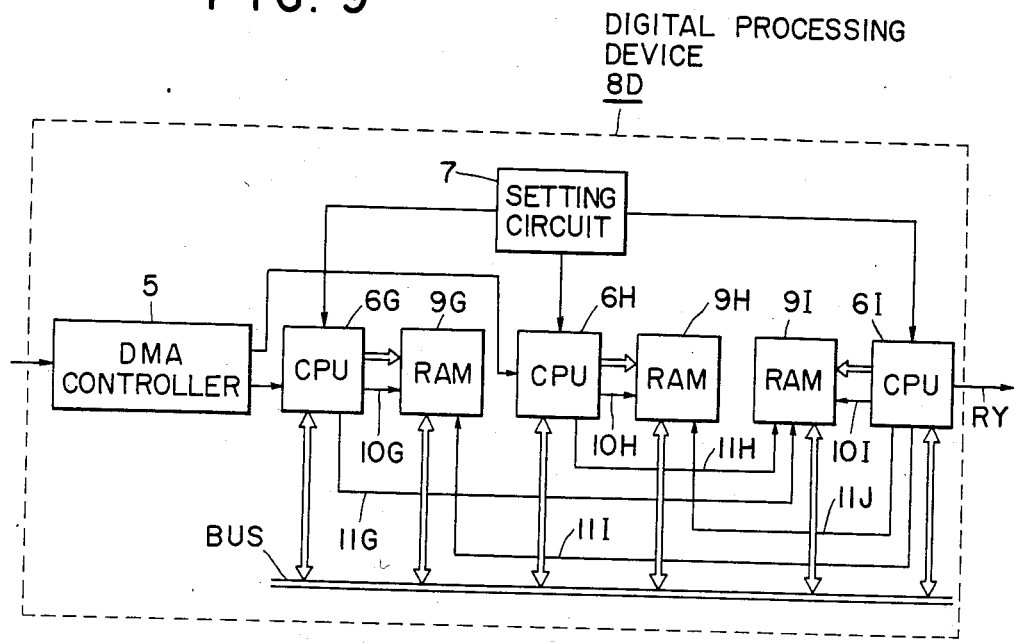

FIG. 9 shows a fourth embodiment of the present invention, which differs from the third embodiment shown in FIG. 8, in that two sets of first CPU's and first RAM's are provided in the digital processing device 8D for carrying out the discriminating operations of the relay elements, which are allotted to the CPU's and the RAM's. More specifically, the contents of a second RAM 9I can be read out upon reception of either one of READ signals 11G and 11H delivered from the two first CPU's 6G and 6H. Furthermore, a second CPU 6I can read out the contents of the two first RAM's 9G and 9H by delivering READ signals 11I and 11J to the RAM's 9G and 9H, respectively. Other components similar to those provided in the previous embodiment shown in FIG. 8 are designated by the same reference numerals.

With such an arrangement, the capability of carrying out discriminating operations of the relay elements is doubled.

The embodiment of FIG. 9 is only illustrative of an example, and the invention envisages a system having any number of the first CPU's and any number of the second CPU's, the numbers being adjusted so that the overall system has an optimum capability to the particular application.

Where the second CPU is so formed as to perform a logical operation whereby a tripping output is produced only when an AND (logical-product) condition is satisfied between the results of the relay discriminating operations carried out by the two first CPU's 6G and 6H, no trip output will be produced when a trouble occurs in one of the CPU's 6G and 6H. For instance, when a trouble occurs in the first CPU 6G, and an erroneous discrimination is made in the CPU 6G, this trouble does not affect the CPU 6H, so that unless the first CPU 6H has a trouble simultaneously, erroneous operation of the relay elements whose discriminating operations are performed in the CPU 6H is prevented, with the result that AND condition is not satisfied and erroneous production of the tripping output is prevented.

Figure 10:
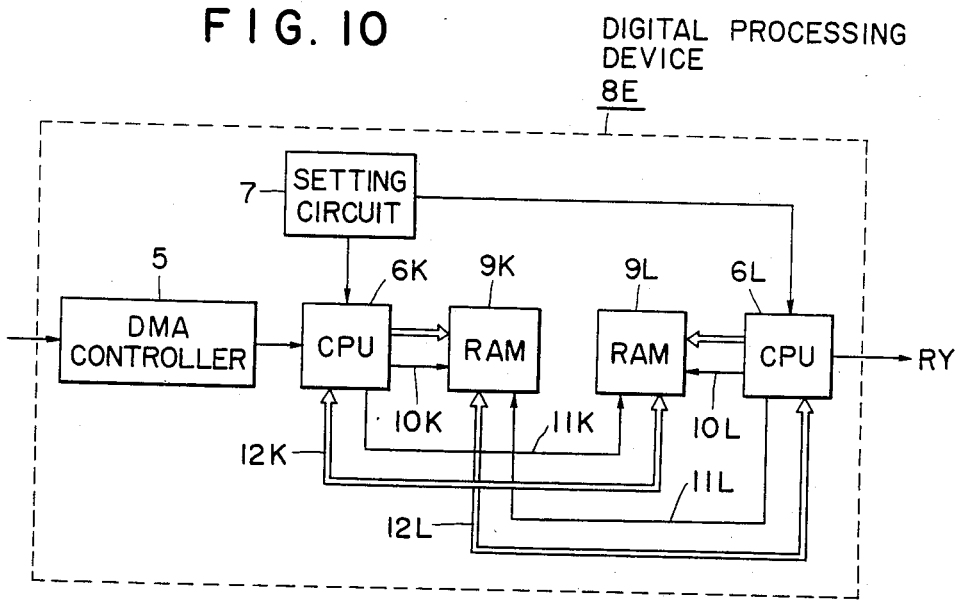

FIG. 10 shows a fifth embodiment of the invention which is different from the third embodiment shown in FIG. 8 in that the digital processing device now designated by 8E is so constructed that sets of address/data lines 12K and 12L are provided between a first CPU 6K and a second RAM 9L and between a second CPU 6L and a first RAM 9K, respectively, and the BUS used in the embodiment shown in FIG. 8 is eliminated. Other components, which are similar to those described with respect to the third embodiment, are designated by the same reference numerals.

In the fifth embodiment, the reading operation of the first CPU 6K from the second RAM 9L and the reading operation of the second CPU 6L from the first RAM 9K are carried out through the respective sets of address/data lines 12K and 12L, instead of the BUS. As a result, the reading operation of the first and second CPU's 6K and 6L out of the RAM's 9L and 9K can be carried out without being disturbed by any trouble of the BUS and without the need of waiting the termination of the reading operation carried out by the other CPU. The process speed of the protective relay system is therefore further improved. Moreover, even when a trouble occurs in one of the sets of the address/data lines, reading and writing conducted through other sets of the address/data lines can be continued.

Although in the above described embodiments, the operations or loads of the CPU's have been divided into the discriminating operations of the relay elements and the logical operations. But alternative forms of divisions may also be adopted. For instance, the first CPU or CPU's may be adapted to execute part of the logical operations, as well as the discriminating operations, while the second CPU or CPU's are made to execute the remainder of the logical operations. More specifically the arrangement may be such that the first CPU in FIG. 3 executes discriminating operations of the relay elements SU, O1 and O2 and the logical operations of the AND gates AND1 and AND2, while the second CPU executes the logical operations of the timers TDE1 and TDE2 and the OR gate OR. What is essential is that part of the entire operations is performed by one or more first CPU's and the results (intermediate results) of the operations are stored in one or more RAM's provided in association with the respective first CPU's, and are read by one or more second CPU's, which performs the remainder of the entire operations.

In the embodiments described above, only a single setting circuit SET is provided and is connected to various CPU's. But alternatively a plurality of setting circuits may be provided. For instance there may be the same number of setting circuits as are the CPU's, with each setting circuit connected to the respective one of the CPU's. Moreover, the setting circuit or circuits may be connected through the BUS to the CPU or CPU's so that the set values are supplied to the CPU or CPU's through the BUS.

Although, in the above described embodiments, the digital data such as data on voltages v and currents i are inputted into the first CPU through a DMA controller, the invention is not restricted to such an arrangement, and it may be so arranged that the first CPU reads the input data through an input register. Moreover, the DMA controller or the above-mentioned input register may be connected to the BUS, and the input data may be supplied to the first CPU or CPU's through the BUS.

An output register may be further provided and connected to the BUS, and the second CPU may deliver the relay output through the output register.

Where a plurality of the first CPU's are provided, the input converters, sample/hold circuits, the multiplexer, A/D converters and the DMA controller may be provided in common for all the first CPU's, i.e., they may be shared by all the first CPU's, or alternatively, they may be provided separately for each of the first CPU's. Moreover, part of them may be shared by all the first CPU's and the remainder of them may be provided separately for each of the first CPU's.

The RAM or RAM's (9A-9K) may be mounted on the same board as the CPU or CPU's (6A-6L). The term "memory unit" as used in the claims should therefore be construed to cover a memory device which is mounted on the same board as a CPU or CPU's.

According to the above described embodiments, the operations to be performed by CPU's are divided into relay element discriminating operations and logical operations, each of the CPU's performs either part or entirety of the discriminating operations, or the logical operations, and data transfer between the CPU's is carried out through one or more memory devices connected therebetween, into which data can be written only from those CPU's which perform the relay element discriminating operations and reading operations can be performed by the remaining CPU or CPU's. In consequence, even when a failure occurs in hardware or software of a CPU, data which has been written in a memory device will not be changed by the CPU having a failure. A failure in one CPU will not develop into a failure throughout the entire system, as would happed in a prior art system having a single CPU executing all the operations.

Furthermore, where one or more CPU's are added to cope with a demand for an increase in the number of relay elements and logical operations, the addition does not affect other CPU's of the system because the CPU's are separated, in a sense, from each other by means of memory devices. As a result, the checking of the programs needs to be done for those parts which have been added or modified. Accordingly, expansion can be readily made, and standardization of those parts which are not modified is possible.

Since an appropriate amount of functions suitable for the particular objects to be protected can be obtained by varying the number of the CPU's, it is not necessary for a CPU to have excessive capability so as to allow for any future increase in the required amount of functions. The cost of the system can therefore be reduced.

The invention thus provides a digital protective relay system which is reliable, which can be readily expanded, which can be so modified that it just meets the requirement, and which can be formed at a minimum cost.

What is claimed is:

1. A digital protective relay system for protecting an electric power system, said relay system comprising:
   at least one first digital operation device receiving digital data on electrical quantities such as voltages and/or currents of the power system and performing discriminating operations based on said digital data to produce discrimination results relating to conditions of the power system,
   at least one memory unit connected to said first digital operation device for receiving said discrimination results to store the same therein, and
   at least one second digital operation device connected to said memory unit to receive said discrimination results for performing a logical operation in which said discrimination results are combined to determine whether or not a trip signal should be generated and for generating and outputting said trip signal as an output of said digital protective relay system when it is determined that said output signal should be generated,
   wherein said discrimination operations and logical operation of said digital protective relay system are divided between said at least one first operation device and said at least one second digital operation device in such a manner that said discrimination operations are performed only by said at least one first operation device and said logical operation and generation of said trip signal are performed only by said at least one second digital operation device.

2. A digital protective relay system according to claim 1, wherein said memory unit is a multibit memory and is connected so as to permit writing only by said first operation device and to permit reading only by said second operation device.

3. A digital protective relay system according to claim 1, wherein said system further comprises a common bus connected to said first operation device, said receiving of digital data by said first digital operation device and said storing of said digital data in said memory unit being performed through said common bus, and further wherein said system further comprises at least an additional memory unit connected to said common bus for receiving a final result of the logical operation to store the same therein by said second digital operation device, and wherein said additional memory unit is read out by said first digital operation device.

4. A digital protective relay system according to claim 3, wherein said storing in said additional memory unit is performed through said common bus.

5. A digital protective relay system according to claim 1, wherein said first digital operation device produces a reactance element and a mho element of said electric power system as one of said discrimination results, and wherein said second digital operation device performs said digital operation in which said discrimination results are combined based on said reactance element and said mho element to produce said trip signal.

6. A digital protective relay system for protecting an electric power system, said relay system comprising:
- at least one first digital operation device receiving digital data on electrical quantities of the power system and performing a discriminating operation based on said digital data to produce discrimination results,
- at least one memory unit for receiving said discrimination results to store the same therein,
- at least one second digital operation device receiving said discrimination results from said memory unit for performing a logical operation in which said discrimination results are combined and for determining whether or not a trip signal should be generated and outputting said trip signal as an output of said digital protective relay system when it is determined that said trip signal should be outputted,
- a first exclusive address/data line connecting said first digital operation device and said memory unit, said first digital operative device writing said discrimination results into said memory unit through said address/data line, and
- a common bus connected to said digital operation device, said second digital operation device and said memory unit, through which the stored contents in said memory unit are read out by said second digital operation device, wherein said discrimination operation and logical operation of said digital protective relay system are divided between said at least one first operation device and said at least one second digital operation device in such a manner that said discrimination operation is performed only by said at least one first operation device and said logical operation and generation of said trip signal are performed only by said at least one second digital operation device.

7. A digital protective relay system according to claim 6, wherein said memory unit is so connected as to permit writing only by said first operation device and to permit reading only by said second operation device, and wherein said system further comprises at least an additional memory unit which receives a final result of the logical operation to store the same therein and a second exclusive line connecting said second digital operation device and said additional memory unit, through which said additional memory unit is written only by said second digital operation device, and the contents of said memory unit and said additional memory unit are read out through said common bus.

8. A digital protective relay system according to claim 6, wherein said first digital operation device produces a reactance element and a mho element of said electric power system as one of said discrimination results, and wherein said second digital operation device performs said digital operation in which said discrimination results are combined based on said reactance element and said mho element to produce said trip signal.

9. A digital protective relay system for protecting an electric power system, said relay system comprising:
- at least one first digital operation device receiving digital data on electrical quantities of the power system and performing discriminating operations of the relay system to produce discrimination results,
- at least one second digital operation device performing a logical operation in which said discrimination results are combined, and which determines whether or not a trip signal should be produced and outputs a trip signal as an output of said digital protective relay system when a determination is made that a trip signal should be produced,
- at least one memory unit storing the discrimination result, which is so connected as to permit writing only by said first digital operation device, and to permit reading only by said second digital operation device,
- at least one additional memory unit storing a final result of the operation, which is so connected as to permit reading by said first digital operation device and to permit writing by said second digital operation device,
- said first digital operation device and said additional memory unit being connected by a first address/data line, and said second digital operation device and said memory unit being connected by a second address/data line, wherein said discrimination operation and logical operation of said digital protective relay system are divided between said at least one first operation device and said at least one second digital operation device in such a manner that said discrimination operation is performed only by said at least one first operation device and said logical operation and generation of said trip signal are performed only by said at least one second digital operation device.

* * * * *